United States Patent Office 3,406,071
Patented Oct. 15, 1968

3,406,071
NAPHTHOL SULFONAMIDES AS COUPLING COMPONENTS FOR LIGHT-SENSITIVE DIAZOTYPE MATERIALS
Oskar Süs, Wiesbaden-Biebrich, and Heinz Schäfer, Wiesbaden-Sonnenberg, Germany, assignors, by mesne assignments, to Keuffel & Esser Company, Hoboken, N.J.
No Drawing. Filed Sept. 11, 1964, Ser. No. 395,901
Claims priority, application Germany, Sept. 14, 1963, K 50,826
15 Claims. (Cl. 96—91)

This invention relates to light-sensitive coatings and refers more particularly to coupling components for dry-developing diazotype materials.

Light-sensitive coatings containing an aromatic diazo compound and an aromatic coupling component are well known in the diazotype art for the production of photocopies. Many aromatic coupling components are known, but their selection depends upon factors such as the color of the azo dye ultimately produced. Red to red-brown colors were formerly satisfactory, but modern reproduction techniques now require darker colors because of their greater contrast. A great effort has therefore been made to find compounds which produce azo dyes of darker colors. Blue colors which appear practically black were particularly desirable.

In the diazotype industry, certain polyhydroxy compounds of naphthalene and their derivatives have gained technical importance for the production of darker colors. These are, for example: 2,3-dihydroxy-naphthalene; the amides of 2-hydroxy-naphthalene-3-carboxylic acid with aliphatic amines; and the derivatives of 1-amino-7-hydroxy-naphthalene. Furthermore, sulfonic acids of polyhydroxy naphthalene have been introduced as coupling components for obtaining blue colors, for example: 2,3-dihydroxy-naphthalene-6-sulfonic acid; 2,7-dihydroxy-naphthalene-3,6-disulfonic acid; and 2-hydroxy-naphthalene-3,6-disulfonic acid. The amides of these acids were also proposed for diazotype coatings, but it was not possible to substantially change the color by using these sulfonic acid amides. Generally, only brown or red-brown shades to violet-red shades were obtained with monohydroxy naphthalene monosulfonic acids and their amides. For example, the 1-hydroxy-naphthalene-8-sulfonic acid coupled with p-diazo-diethyl-aniline formed a brown azo dye. If the amide of the same sulfonic acid were used instead of the acid, an azo dye of approximately the same color was obtained.

It has now been found that deep blue to greenish-blue azo dyes are obtainable when 1-hydroxy-napthalene-8-sulfonic acid amides alkylated in the 4-position are used, although the corresponding free sulfonic acids produce much lighter azo dyes. This substantial change of the color toward blue is surprising since it had been thought that amidation hardly influenced the color of the azo dye.

The light-sensitive coatings according to the present invention comprise an aromatic diazo compound and one or more coupling compounds having the general formula:

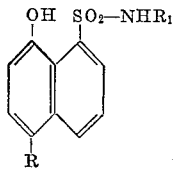

wherein R represents an alkyl group of low molecular weight, $R_1$ represents hydrogen or an alkyl, cycloalkyl, aralkyl of low molecular weight, or the group

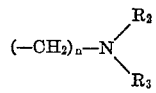

wherein $n$ represents a whole number from 2 to 8, and $R_2$ and $R_3$ represent the same or different alkyl, cycloalkyl, or alkylene groups of low molecular weight, which groups may contain hydroxyl groups, and which may be linked with a carbon, oxygen, sulphur, or nitrogen atom to form a heterocyclic ring with preferably five or six members.

The alkyl group of low molecular weight represented by R is particularly the methyl or ethyl group. Compounds in which R represents an alkyl group of higher molecular weight, such as propyl, butyl, or hexyl are also suitable. The alkyl radical represented by $R_1$ may be methyl, ethyl, propyl, isopropyl, butyl, isobutyl, amyl, hexyl, cyclohexyl, or methylcyclohexyl. If $R_1$ is an aralkyl radical, it may be the benzyl radical. The radicals may carry hydroxyl groups linked to aliphatic carbon atoms. Compounds of the above-mentioned formula are also suitable if $R_1$ stands for the hydroxyethyl or hydroxypropyl group. If $R_1$ represents

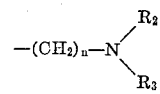

$n$ is preferably 2 to 6, $R_2$ and $R_3$ represent alkyl or cycloalkyl radicals of low molecular weight as mentioned above for $R_1$. Finally, $R_2$ and $R_3$ may also be alkylene groups which are linked by a carbon atom, an oxygen, a sulphur, or a nitrogen atom forming a ring with preferably five or six members as is the case with pyrrolidine, piperidine, morpholine, thiomorpholine, and piperazine.

Therefore, one object of the present invention is to provide coupling components for dry-developing diazotype materials which form dark colors.

Another object is to provide 1-hydroxy-naphthalene-8-sulfonamides as coupling components to produce blue images.

Another object is to provide light-sensitive dry-developing diazo compositions for diazotype materials.

Other objects will become apparent in the course of the following specification.

The present sulfonic acid amides are prepared by heating the corresponding 4-alkyl-1,8-naphthosultones in a known manner with ammonia, primary aliphatic or cycloaliphatic amines, or aliphatic diamines which have a primary and a tertiary amino group. The reaction product is subsequently acidified and the sulfonic acid amide is isolated by recrystallization or reprecipitation. When a diamine is used, the amidation product contains a further basic nitrogen atom in the form of a salt of the acid used for acidification. The free base can be obtained from this salt by treatment with alkali. 4-methyl-1,8-naphthosultone and 4-ethyl-1,8-naphthosultone may be prepared for example as suggested by G. Schetty, Helv. Chem. Acta, 31, p. 1229 (1948), and 30 p. 1659 (1947).

A large number of known diazo compounds are suitable for use in conjunction with the present sulfonic acid amides. Preferably, basic diazo compounds derived from a p-phenylene diamine in which one amino group is diazotized and the other group is substituted with a tertiary amino group are used to obtain dark colors.

Particularly strong and deep blue tones are obtained with highly light-sensitive diazo compounds which are similar to the above-mentioned compounds, but which also contain one or two alkoxy groups of low molecular weight, in particular methoxy or ethoxy groups in para-position to each other on the benzene nucleus. The preferred group of diazo compounds has the general formula:

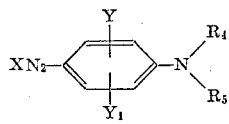

wherein $R_4$ and $R_5$ represent the same or different alkyl radicals which may contain hydroxyl groups and which have from 1 to 6 carbon atoms or members of a 5- or 6-membered heterocyclic ring which may contain an oxygen, sulphur or second nitrogen atom, X is an acid radical, and Y and $Y_1$ represent hydrogen or alkoxy groups of low molecular weight, Y and $Y_1$ being in para-position to each other where they both stand for alkoxy groups. Salts of the following compounds are suitable: 1-dipropylamino-4-diazobenzene; 1 - diethylamino-3-ethoxy-4-diazobenzene; 1-morpholino-2,5-dimethoxy-4-diazobenzene; 1-morpholino-2,5-diethoxy-4-diazobenzene; and their simple homologs. If desired, mixtures of these compounds may also be used. Hydrochloric acid, sulfuric acid and hydrofluoboric acid are particularly suitable as acid components in these salts, but other acids which are suitable for forming salts with diazonium compounds may also be used. In most cases these salts are present in the form of double salts with inorganic salts, such as zinc chloride or cadmium chloride. The diazo compound and the coupling component are applied in a conventional manner from a solution to a support, such as transparent paper, lacquered paper, or transparent foil. If compounds with basically substituted alkyl groups are used, it is possible to form water-soluble salts by reaction of these groups with organic or inorganic acids. Normally, however, it is not necessary to prepare these salts in their pure form, since the light sensitive coatings are applied to the support from a solution which in almost all cases contains acids which have been added as stabilizers.

Suitable stabilizing acids are inorganic or organic acids, such as hydrochloric acid, boric acid, formic acid, citric acid, and 1,3,6-naphthalene-trisulfonic acid. Frequently the solutions also contain inorganic salts, such as zinc chloride and aluminum sulfate, and, if desired, further additives for speeding up the dissolution of the coupling component or for accelerating the subsequent coupling process. Additives of this nature are urea, thiourea, and water-miscible organic solvents such as acetone, methylethyl ketone, ethylene glycol, ethylene glycol monomethylether, and the like. The coupling components according to the present invention are very compatible with the above-mentioned additives and with other additives customarily used in diazotype processes, such as anti-yellowing agents and plasticizers.

The present invention is further illustrated in greater detail with the aid of the following examples which are not intended to limit the scope of the present invention.

The following table gives the structural formulas of the sulfonamides mentioned in the examples.

Example 1.—A sensitizing solution was prepared by dissolving the following chemicals in water and adjusting the volume to 100.0 cc.

| | |
|---|---|
| Citric acid _____ g__ | 4.0 |
| Boric acid _____ g__ | 3.0 |
| Thiourea _____ g__ | 4.0 |
| Naphthalene-1,3,6-trisulfonic acid (sodium salt) _____ g__ | 3.0 |
| Hydrochloride of 1-diethylamino-3-ethoxy-4-diazobenzene (zinc chloride double salt) _____ g__ | 1.0 |
| 4-methyl-1-hydroxy - naphthalene - 8 - beta-diethylaminoethyl-sulfonamide (Formula 9) _____ g__ | 1.2 |
| Concentrated hydrochloric acid _____ cc__ | 4.0 |

A photocopying base paper was coated with this solution and copies were produced in a known manner. After development with ammonia vapor, copies with blue lines having a deep greenish tinge were obtained on a pure white background.

To prepare the sulfonic acid amide according to Formula 9, 10 g. of 4-methyl-1,8-naphthosultone were gently boiled for 30 minutes together with 20 cc. beta-diethylamino-ethylamine. The reaction mixture was poured into cooled hydrochloric acid (32%) and the 4-methyl-1-hydroxy - naphthalene - 8 - beta-diethylaminoethyl-sulfonamide-hydrochloride crystallized out. The crude product was purified by recrystallizing it from concentrated hydrochloric acid. The melting point was 130° C. (decomposition).

Example 2.—A sensitizing solution according to the following formula was prepared:

| | |
|---|---|
| Citric acid _____ g__ | 4.0 |
| Fluoborate of 1 - morpholino - 2,5-diethoxy-4-diazobenzene _____ g__ | 6.0 |
| 4 - methyl - 1-hydroxy-naphthalene-8-n-propyl-sulfonamide (Formula 6) _____ g__ | 4.6 |
| Water _____ cc__ | 25 |
| Isopropyl alcohol _____ cc__ | 40 |
| Glycol monomethyl ether _____ cc__ | 20 |
| Methylethylketone _____ cc__ | 10 |
| Formic acid _____ cc__ | 5 |

A cellulose acetate foil coated with this solution produced a deep green-blue copy of an original.

Equally good results were obtained with the sulfonamides listed in the table as Formulas 7 and 8.

To prepare the 4-methyl-1-hydroxy-naphthalene-8-n-propylsulfonamide (Formula 6), 20 g. 4-methyl-1,8-naphthosultone were heated for 30 minutes at 60° C. together with 40 cc. n-propylamine. The resulting yellow solution was poured into cold hydrochloric acid, whereby the desired sulfonamide was precipitated. This was drawn off by suction, washed with water, and dried. The crude product was purified by recrystallizing it from petrol (boiling point 80–125° C.). The melting point was 84–85° C. (decomposition).

To prepare the 4-methyl-1-hydroxy-naphthalene-8-n-butysulfonamide (Formula 7), 20 g. of 4-methyl-1,8-naphthosultone, 40 cc. of n-butylamine and 10 cc. of dimethylformamide were heated on a steam bath for 20 minutes until they dissolved. The reaction mixture was poured into dilute cold hydrochloric acid and the resulting sulfonic acid amide was recrystallized from petrol (boiling point 80–125° C.) after drying. The melting point was 95–96° (decomposition).

4-ethyl-1-hydroxy-naphthalene-8-sulfonamide (Formula 8) was prepared by adding 5 g. of 4-ethyl-1,8-naphthosultone dissolved in 40 cc. of dimethylformamide dropwise to 50 cc. of liquid ammonia. The resulting yellow paste liquified when carefully heated. The reaction mixture was poured into 40 cc. water, dissolved completely by the addition of a caustic soda solution, filtered, and rendered acid by the addition of hydrochloric acid. The sulfonamide precipitated in the form of white crystals and was purified by dissolving and precipitating it from a mixture of dimethylformamide and water. The melting point was 186° C. (decomposition).

Example 3.—A baryta paper which had been lacquered with cellulose acetate was coated with a solution prepared according to the following formula:

| | |
|---|---|
| Water _____ cc__ | 30.0 |
| Isopropyl alcohol _____ cc__ | 45.0 |
| Glycol monomethylether _____ cc__ | 15.0 |
| Methylether ketone _____ cc__ | 5.0 |
| Formic acid _____ cc__ | 5.0 |
| Citric acid _____ g__ | 5.0 |
| Fluoborate of 1-dipropylamino-4-diazobenzene _ g__ | 5.0 |
| 4 - methyl - 1 - hydroxy-naphthalene-8-sulfonamide (Formula 1) _____ g__ | 4.0 |

The copies which were obtained in known manner by dry development had an intense dark blue tone, and in maximum densities, an almost black tone on a pure white background. Almost identical results with regard to color were obtained under approximately the same conditions with the compounds according to Formulas 2, 3, 4 and 5. These five sulfonic acid amides were prepared as follows:

90.0 g. 4-methyl-1,8-naphthosultone was purified by distillation, and heated for two hours in an autoclave at 65° C. in 450 cc. of concentrated aqueous ammonia. The resulting yellow solution was diluted with water and rendered acid to Congo Red with dilute hydrochloric acid. The 4 - methyl - 1-hydroxy-naphthalene-8-sulfonamide (Formula 1) was precipitated. This was drawn off by suction, washed with water, and dried. It was then purified by dissolving and reprecipitating it from a mixture of dimethylformamide and water. White crystals having a melting point of 207° C. (decomposition) were obtained.

10.0 g. 4-methyl-1,8-naphthosultone were heated with 20.0 cc. benzylamine and 10.0 cc. dimethylformamide for 30 minutes at 70–80° C. The resulting yellow solution was poured into dilute, cold hydrochloric acid. The precipitated 4 - methyl - 1-hydroxynaphthalene-8-benzylsulfonamide (Formula 5) was recrystallized from methanol, dissolved again, and re-precipitated from a mixture of chloroform and petrol. The melting point was 158–159° C.

30.0 cc. of ethanolamine were poured over 10.0 g. of 4 - methyl - 1,8-naphthosultone, the exothermic reaction causing the latter to dissolve at 90° C. The reaction was accelerated when 10.0 cc. of dimethylformamide was added. The 4-methyl-1-hydroxynaphthalene-8-beta-hydroxyethyl-sulfonamide (Formula 4) was obtained as an oily product by pouring the reaction mixture into dilute, cold hydrochloric acid.

200 cc. of an aqueous solution (40%) of ethylamine were poured over 30.0 g. of 4-methyl-1,8-naphthosultone and gently boiled for twenty minutes. The resulting yellow solution was poured into a mixture of ice and hydrochloric acid, and the 4-methyl-1-hydroxy-naphthalene-8-ethyl-sulfonamide (Formula 3) was precipitated. This was drawn off by suction and purified by recrystallizing it from methanol. The melting point was 162° C.

180 cc. of an aqueous solution (30%) of methylamine were added to 30.0 g. of 4-methyl-1,8-naphthosultone and gently boiled for twenty minutes. The 4-methyl-1,8-naphthosultone dissolved and the reaction mixture turned yellow. It was poured into acidified ice water, and the precipitated 4-methyl-1-hydroxynaphthalene-8-methylsulfonamide (Formula 2) was recrystallized from methanol. The melting point was 160° C.

Example 4.—A solution was prepared according to the following formula:

| | | |
|---|---|---|
| Citric acid | g | 3.0 |
| Boric acid | g | 3.0 |
| Thiourea | g | 5.0 |
| Aluminum sulfate | g | 2.0 |
| Naphthalene-1,3,6-trisulfonic acid (sodium salt) | g | 3.0 |
| 4-methyl-1-hydroxy-naphthalene-8-(gamma-morpholino-propyl)-sulfonamide (Formula 11) | g | 1.7 |
| Hydrochloride of 1 - morpholino - 2,5 - dimethoxy-4-diazobenzene (zinc chloride double salt) | g | 1.5 |
| Concentrated hydrochloric acid | cc | 4.0 |
| Water | cc | 100.0 |

This was coated on a photocopying base paper which had been provided with a precoating of a finely-divided silicic acid and polyvinyl acetate. Subsequently photocopies were produced in a known manner. Blue lines on a pure white background were obtained. Equally good results under otherwise identical conditions were obtained with the compounds listed in the table as Formulas 10 and 12.

The sulfonic acid amides according to Formulas 10, 11 and 12 were prepared as follows:

Formula 1
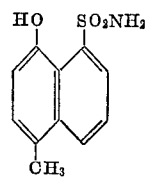

Formula 2
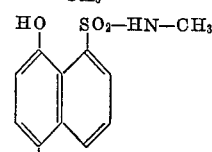

Formula 3
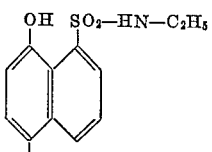

Formula 4
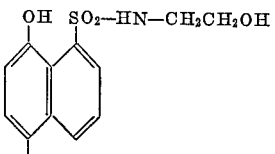

Formula 5
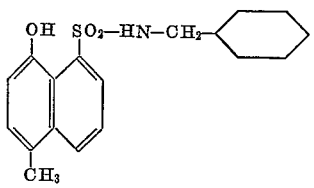

Formula 6
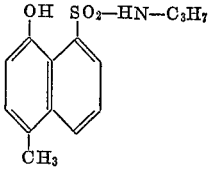

Formula 7
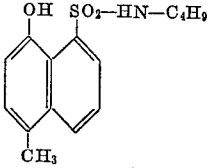

Formula 8
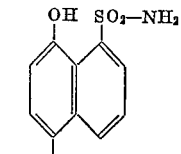

Formula 9
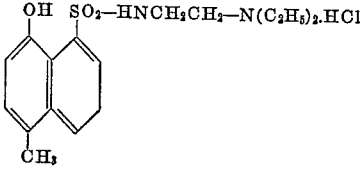

Formula 10
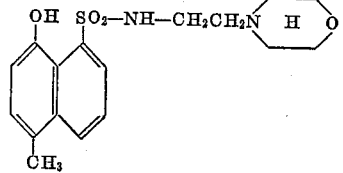

Formula 11 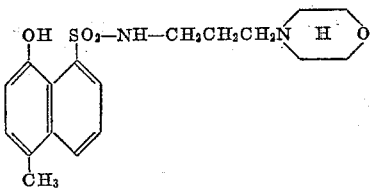

Formula 12 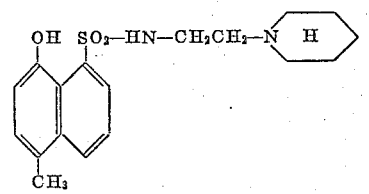

11.0 g. of 4-methyl-1,8-naphthosultone were suspended in 10.0 cc. of dimethyl formamide, and 15.0 g. of N-(gamma-amino propyl)-morpholine were added. When heated on a steam bath, complete solution took place after approximately one-half hour. The reaction mixture was poured into dilute hydrochloric acid and the resulting solution was filtered through charcoal. By neutralization with a solution of caustic soda, the 4-methyl-1-hydroxy - naphthalene-8-(gamma-morpholino propyl)-sulfonamide (Formula 11) was obtained from the solution. It was purified by recrystallizing it from methanol to which water was added. The melting point was 111–112° C.

13.0 g. of N-(beta-aminoethyl)-morpholine were poured over 11.0 g. of 4-methyl-1,8-naphthosultone, and the reaction mixture was heated for half an hour over the steam bath while kneading it thoroughly all the time. The half-solid yellow mixture was dissolved in a dilute solution of caustic soda, filtered, and rendered neutral with 50% acetic acid. The resulting 4-methyl-1-hydroxy-naphthalene-8-(beta-morpholinoethyl)-sulfonamide (Formula 10) was purified by recrystallizing it from a solution of methanol and water. The melting point was 163–164° C.

10.0 cc. of dimethyl formamide and 12.0 g. of N-(beta-aminoethyl)-piperidine were added to 11.0 g. of 4-methyl-1,8-naphthosultone, and the reaction mixture was heated for half an hour on a steam bath. The resulting solution was poured into a solution of caustic soda and filtered. After neutralization with acetic acid, the 4-methyl-1-hydroxy - naphthalene-8-(beta-piperidinoethyl)-sulfonamide (Formula 12) was obtained in an oily form. When allowed to stand for some time, or when treated with methanol, crystallization occurred. When the compound was recrystallized from methanol and water, it sintered at approximately 100° C. and darkened at 185° C. The hydrochloride which was easily obtainable from concentrated hydrochloric acid started to decompose at 80° C.

It is apparent that the described examples are capable of many variations and modifications. All such variations and modifications are to be included within the scope of the present invention.

What is claimed is:

1. A light-sensitive, dry-developing diazo composition which comprises a light-sensitive diazo compound and a coupling component selected solely from compounds having the formula:

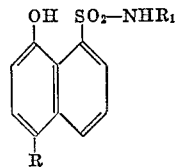

where R is alkyl with up to six carbon atoms, and $R_1$ is a member selected from the group consisting of hydrogen, alkyl with up to six carbon atoms, cycloalkyl with six to seven carbon atoms, hydroxy alkyl with three carbon atoms and the group:

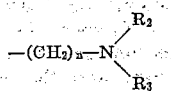

where $n$ is a whole number from two to six and $R_2$ and $R_3$ are members selected from the groups consisting of:
group A and where $R_2$ and $R_3$ are selected individually from the group consisting of alkyl with up to six carbon atoms and cycloalkyl with six to seven carbon atoms; and
group B where $R_2$ and $R_3$ are members of the same heterocyclic ring selected from the group consisting of 5- and 6-membered rings said diazo compound having the formula:

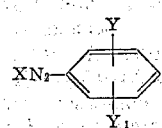

where $R_4$ and $R_5$ are members selected from one of the groups consisting of:
group C wherein $R_4$ and $R_5$ are members selected individually from the group consisting of alkyl radicals having one to six carbon atoms and hydroxy alkyl radicals having from one to six carbon atoms; and
group D wherein $R_4$ and $R_5$ are members of the same heterocyclic ring selected from the group consisting of 5- and 6-membered heterocyclic rings, where X is an acid radical, and where Y and $Y_1$ are members selected individually from the group consisting of hydrogen and alkoxy groups of low molecular weight and where Y and $Y_1$ are in para-position to each other when both are alkoxy groups.

2. Diazotype material comprising:
(a) a support; and
(b) a light-sensitive composition according to claim 1.

3. Diazotype material according to claim 2 wherein said coupler component is a 4-methyl-1-hydroxy-naphthalene-8-sulfonamide.

4. Diazotype material according to claim 3 wherein said coupler component is 4-methyl-1-hydroxy-naphthalene-8-sulfonamide.

5. Diazotype material according to claim 3 wherein said coupler component is 4-methyl-1-hydroxy-naphthalene-8-methyl-sulfonamide.

6. Diazotype material according to claim 3 wherein said coupler component is 4-methyl-1-hydroxy-naphthalene-8-(beta-hydroxyethyl)-sulfonamide.

7. Diazotype material according to claim 3 wherein said coupler component is 4-methyl-1-hydroxy-naphthalene-8-benzyl-sulfonamide.

8. Diazotype material according to claim 3 wherein said coupler component is 4-methyl-1-hydroxy-naphthalene-8-(beta-morpholinoethyl)-sulfonamide.

9. Diazotype material according to claim 2 wherein said diazonium compound is a p-phenylene diamine derivative having the general formula:

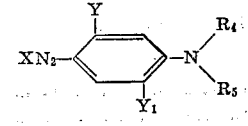

wherein $R_4$ and $R_5$ are selected from:
group E wherein $R_4$ and $R_5$ are selected from the group consisting of alkyl and hydroxy-alkyl radicals having one or two carbons; and group F wherein $R_4$ and $R_5$ are members of a 5 or 6 membered heterocyclic ring with the nitrogen atom;

Y and $Y_1$ are members selected from the group consisting of hydrogen and alkoxy groups of low molecular weight; and X is an acid radical.

10. A coupling component for a dry-developing diazotype material, which has the following formula:

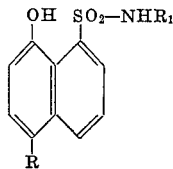

where R is alkyl with up to six carbon atoms, and $R_1$ is a member selected from the group consisting of hydrogen, alkyl with up to six carbon atoms, cycloalkyl with six to seven carbon atoms, hydroxyalkyl with up to three carbon atoms and the group:

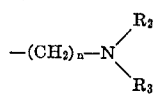

where $n$ is a whole number from two to six and $R_2$ and $R_3$ are members selected from the group consisting of:
  group A where $R_2$ and $R_3$ are selected individually from the group consisting of alkyl with up to six carbon atoms and cycloalkyl with six to seven carbon atoms; and
  group B where $R_2$ and $R_3$ are members of the same heterocyclic ring selected from the group consisting of 5- and 6-membered rings.

11. A coupling component in accordance with claim 10 which is 1 - hydroxy-4-methyl-naphthalene-8-sulfonamide.

12. A coupling component in accordance with claim 10 which is 1-hydroxy-4-methyl-naphthalene-8-methyl-sulfonamide.

13. A coupling component in accordance with claim 10 which is 1-hydroxy-4-methyl-naphthalene-8-(beta-hydroxyethyl)-sulfonamide.

14. A coupling component in accordance with claim 10 which is 1-hydroxy-4-methyl-naphthalene-8-benzyl-sulfonamide.

15. A coupling component in accordance with claim 10 which is 1 - hydroxy-4-methyl-naphthalene-8-(beta-morpholinoethyl)-sulfonamide.

References Cited

UNITED STATES PATENTS

| | | | |
|---|---|---|---|
| 1,857,920 | 5/1932 | Lantz | 96—91 |
| 2,233,038 | 2/1941 | Sus et al. | 96—91 |
| 2,356,475 | 8/1944 | Schinzel | 96—100 X |
| 2,423,572 | 7/1947 | Woodward | 260—200 X |
| 2,512,845 | 6/1950 | Widmer et al. | 260—200 |
| 2,537,098 | 1/1951 | Slifkin et al. | 96—91 |
| 2,545,057 | 3/1951 | Von Glahn et al. | 96—91 |
| 2,792,383 | 5/1957 | Buehler et al. | 260—200 X |
| 2,946,684 | 7/1960 | Sus et al. | 96—91 |
| 2,856,397 | 10/1958 | Pfitzner et al. | 260—200 X |
| 2,970,909 | 2/1961 | Slimowicz | 96—91 |
| 3,272,627 | 11/1964 | Sus et al. | 96—91 X |
| 2,494,906 | 1/1950 | Slifkin et al. | 96—91 |
| 2,603,639 | 7/1952 | Friedrichsen | 260—239.6 |
| 3,192,197 | 6/1965 | Dietrich et al. | 260—239 |

NORMAN G. TORCHIN, *Primary Examiner.*

C. L. BOWERS, *Assistant Examiner.*